United States Patent
Ueki

(10) Patent No.: US 11,138,491 B2
(45) Date of Patent: Oct. 5, 2021

(54) RFID TAG AND RFID TAGGED ARTICLE

(71) Applicant: Murata Manufacturing Co., Ltd., Nagaokakyo (JP)

(72) Inventor: Noriyuki Ueki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 147 days.

(21) Appl. No.: 16/455,859

(22) Filed: Jun. 28, 2019

(65) Prior Publication Data

US 2019/0392282 A1      Dec. 26, 2019

Related U.S. Application Data

(63) Continuation of application No. PCT/JP2019/002003, filed on Jan. 23, 2019.

(30) Foreign Application Priority Data

Jun. 25, 2018 (JP) .............................. JP2018-120101

(51) Int. Cl.
*H01Q 1/22* (2006.01)
*H01Q 1/38* (2006.01)
(Continued)

(52) U.S. Cl.
CPC ... *G06K 19/07779* (2013.01); *G06K 19/0775* (2013.01); *H01Q 1/2283* (2013.01); *H01Q 1/38* (2013.01); *H01Q 1/422* (2013.01)

(58) Field of Classification Search
CPC ......... G06K 19/07779; G06K 19/0775; G06K 19/07784; G06K 19/07722; H01Q 1/422;
(Continued)

(56) References Cited

U.S. PATENT DOCUMENTS

| 10,411,767 B2* | 9/2019 | Zhao ........................ H01Q 7/06 |
| 2012/0007787 A1* | 1/2012 | Schantz .................. H01Q 1/273 343/788 |

(Continued)

FOREIGN PATENT DOCUMENTS

| JP | H11297520 A | 10/1999 |
| JP | 2012201596 A | 10/2012 |

(Continued)

OTHER PUBLICATIONS

Written Opinion of the International Searching Authority issued for PCT/JP2019/002003, dated Feb. 26, 2019.
(Continued)

*Primary Examiner* — Andrea Lindgren Baltzell
*Assistant Examiner* — Michael M Bouizza
(74) *Attorney, Agent, or Firm* — Arent Fox LLP

(57) ABSTRACT

An RFID tag including an RFIC element, a first inductor element that includes a first insulating substrate having a mounting surface on which the RFIC element is mounted, and first coil-shaped antenna internally embedded in first insulating substrate with a winding axis perpendicular to the mounting surface, and second inductor element that includes second insulating substrate mounted on the mounting surface, and second coil-shaped antenna internally embedded in second insulating substrate, electrically connected to first coil-shaped antenna, and with a winding axis parallel to the mounting surface. The first insulating substrate includes a laminate with dielectric layers or magnetic layers laminated, and the first coil-shaped antenna includes a laminate coil-shaped antenna in which conductor patterns are each formed on a corresponding one of the layers of the laminate, such that they are connected to each other through interlayer connection conductor.

16 Claims, 5 Drawing Sheets

(51) Int. Cl.
  *H01Q 1/42* (2006.01)
  *G06K 19/077* (2006.01)
(58) Field of Classification Search
  CPC .......... H01Q 1/38; H01Q 1/2283; H01Q 7/00;
  H01Q 1/2216
  See application file for complete search history.

(56) References Cited

U.S. PATENT DOCUMENTS

| | | |
|---|---|---|
| 2012/0206239 A1 | 8/2012 | Ikemoto |
| 2014/0035793 A1 | 2/2014 | Kato et al. |
| 2014/0253404 A1 | 9/2014 | Ikemoto et al. |

FOREIGN PATENT DOCUMENTS

| | | | |
|---|---|---|---|
| JP | 2014064267 A | 4/2014 |
| WO | 2013115158 A1 | 8/2013 |

OTHER PUBLICATIONS

International Search Report issued for PCT/JP2019/002003, dated Feb. 26, 2019 (in Japanese).
International Search Report issued for PCT/JP2019/002003, dated Feb. 26, 2019.

\* cited by examiner

RFID TAG AND RFID TAGGED ARTICLE

CROSS REFERENCE TO RELATED APPLICATIONS

The present application is a continuation of PCT/JP2019/002003 filed Jan. 23, 2019, which claims priority to Japanese Patent Application No. 2018-120101, filed Jun. 25, 2018, the entire contents of each of which are incorporated herein by reference.

TECHNICAL FIELD

The present disclosure relates to a radio-frequency identification (RFID) tag and an RFID tagged article.

BACKGROUND

Currently, an RFID tag is provided that includes a radio-frequency integrated circuit (RFIC) element, a substrate, and a coil-shaped antenna. This type of RFID is configured with the RFIC element mounted on a mounting surface of the substrate and the coil-shaped antenna internally embedded in the substrate. With the conventional RFID tag, the coil-shaped antenna has a winding axis disposed perpendicular to the mounting surface of the substrate.

When the RFID tag is attached to a metal surface, the metal surface hinders a flow of magnetic flux moving in a direction of the winding axis through an opening area of the coil-shaped antenna, thereby resulting in a reduction in communication distance of the RFID tag. In view of such a problem, Patent Document 1 (identified below) discloses an RFID tag that includes a coil-shaped antenna and a substrate, and has a configuration in which the coil-shaped antenna has a center in a direction of its winding axis located farther from a metal surface than a center of the substrate. According to the RFID tag of Patent Document 1, the coil-shaped antenna is disposed away from the metal surface so as to suppress an influence of the metal surface and thus suppress a reduction in communication distance of the RFID tag.

Patent Document 1: JP 2012-201596 A.

However, in the suppression of reduction in communication distance caused by the metal surface, further improvement is still required of the conventional RFID tag.

SUMMARY OF THE INVENTION

Accordingly, to solve the previously described problem, an object of the present disclosure is to provide an RFID tag and an RFID tagged article that are each configured to achieve further suppression of the reduction in communication distance caused by a metal surface.

Thus, according to an exemplary embodiment, an RFID tag is disclosed according to an exemplary aspect that includes an RFIC element; a first inductor element that includes a first insulating substrate having amounting surface on which the RFIC element is mounted, and a first coil-shaped antenna being internally embedded in the first insulating substrate and having a winding axis in a direction perpendicular or substantially perpendicular to the mounting surface; and a second inductor element that includes a second insulating substrate mounted on the mounting surface, and a second coil-shaped antenna being internally embedded in the second insulating substrate, being electrically connected to the first coil-shaped antenna, and having a winding axis parallel or substantially parallel to the mounting surface.

The first insulating substrate includes a laminate in which a plurality of dielectric layers or a plurality of magnetic layers are laminated.

The first coil-shaped antenna includes a laminate coil-shaped antenna in which conductor patterns, each being formed on a corresponding one of the layers of the laminate, are connected to each other.

Further, an RFID tagged article according to an exemplary aspect includes an article having a metal surface; and an RFID tag attached to the metal surface. The RFID tag includes an RFIC element; a first inductor element that includes a first insulating substrate distanced from and opposite to the metal surface and having a mounting surface on which the RFIC element is mounted, and a first coil-shaped antenna being internally embedded in the first insulating substrate and having a winding axis in a direction perpendicular or substantially perpendicular to the mounting surface; and a second inductor element that includes a second insulating substrate mounted on the mounting surface, and a second coil-shaped antenna being internally embedded in the second insulating substrate, being electrically connected to the first coil-shaped antenna, and having a winding axis parallel or substantially parallel to the mounting surface.

In an exemplary aspect, the first insulating substrate has a laminate in which a plurality of dielectric layers or a plurality of magnetic layers are laminated.

In another exemplary aspect, the first coil-shaped antenna includes a laminate coil-shaped antenna in which conductor patterns, each being formed on a corresponding one of the layers of the laminate, are connected to each other.

With the exemplary aspects of the present disclosure, a reduction in communication distance caused by a metal surface when the exemplary RFID tag is attached thereto can thereby be suppressed.

DETAILED DESCRIPTION

Figure 1:
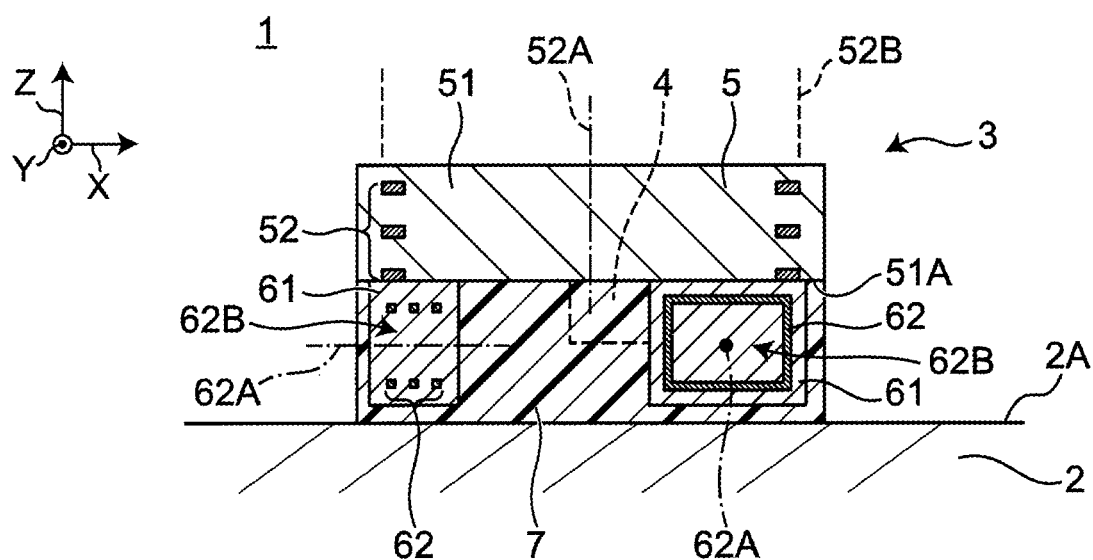
FIG. 1 is a longitudinal sectional view illustrating a schematic configuration of an RFID tag according to an exemplary embodiment of the present disclosure.

As disclosed herein, an RFID tag is provided according to an exemplary aspect of the present disclosure that includes an RFIC element; a first inductor element that includes a first insulating substrate having a mounting surface on which the RFIC element is mounted, and a first coil-shaped antenna being internally embedded in the first insulating substrate and having a winding axis in a direction perpendicular or substantially perpendicular to the mounting surface. Moreover, a second inductor element is provided that includes a second insulating substrate mounted on the mounting surface, and a second coil-shaped antenna being internally embedded in the second insulating substrate, being electrically connected to the first coil-shaped antenna, and having a winding axis parallel or substantially parallel to the mounting surface. Moreover, according to the exemplary aspect, the first insulating substrate includes a laminate in which a plurality of dielectric layers or a plurality of magnetic layers are laminated, and the first coil-shaped antenna includes a laminate coil-shaped antenna in which conductor patterns, each being formed on a corresponding one of the layers of the laminate, are connected to each other.

With this configuration, the RFID tag is attached to a metal surface in a way that the second inductor element is disposed close to the metal surface and the first inductor element is disposed away from the metal surface, thereby further suppressing a reduction in communication distance caused by the metal surface. In other words, the winding axis of the second coil-shaped antenna is disposed parallel or substantially parallel to the mounting surface. Thus, a magnetic field flowing in a direction of the winding axis through an opening area of the second coil-shaped antenna can be less prone to be influenced by the metal surface. The first inductor element is disposed away from the metal surface so as to suppress the influence of the metal surface. Further, in this aspect, the first insulating substrate includes a laminate, and the first coil-shaped antenna includes a laminate coil-shaped antenna, thereby facilitating generation of stronger magnetic field on each of the mounting surface side and its opposite surface side (i.e., a direction from which the magnetic field flows). Thus, the first coil-shaped antenna and the second coil-shaped antenna can work more effectively. This configuration further suppresses the reduction in communication distance caused by the metal surface. Further, the winding axis of the second coil-shaped antenna is disposed parallel or substantially parallel to the mounting surface. This configuration allows, for example, the second coil-shaped antenna to receive a magnetic field generated around the metal surface by eddy current. The eddy current is induced on the metal surface by a high frequency signal radiated from an antenna of a reader/writer. This configuration allows the antenna of the reader/writer and the RFID tag to communicate with each other, even when an opening area of the first coil-shaped antenna does not overlap an opening area in the antenna of the reader/writer.

It is noted that the RFIC element and the second inductor element can be at least partially located within the opening area of the first coil-shaped antenna when viewed in a direction of the winding axis of the first coil-shaped antenna. This configuration allows a reduction in size of the RFID tag.

The RFIC element and the second inductor element can also be disposed on the mounting surface while being spaced apart from each other. With this configuration, the magnetic field flowing in the direction of the winding axis of the first coil-shaped antenna through the opening area of the first coil-shaped antenna is reflected off the RFIC element to flow into the opening area of the second coil-shaped antenna. Accordingly, the second coil-shaped antenna can work more effectively so as to increase the communication distance of the RFID tag.

In another exemplary aspect, a plurality of the second inductor elements can be mounted on the mounting surface, with the plurality of second inductor elements including a plurality of the second coil-shaped antennas having a plurality of the winding axes, and the plurality of second inductor elements being disposed in a way that directions of the winding axes of the second coil-shaped antennas of the plurality of second inductor elements intersect each other. This configuration allows the second coil-shaped antenna of one of the second inductor elements to more reliably receive the magnetic field generated by the eddy current on the metal surface. Accordingly, the second coil-shaped antennas can work more effectively so as to increase the communication distance of the RFID tag.

In addition, the second inductor element may be greater in height from the mounting surface than the RFIC element. With this configuration, the RFIC element can be less prone to hinder the magnetic field generated by the eddy current on the metal surface from flowing into the opening area of the second coil-shaped antennas.

Further, the first insulating substrate can have a resin member formed on the mounting surface in a way that the RFIC element and the second inductor element are sealed. This configuration suppresses malfunction such as a short circuit due to water wetting the first insulating substrate in the area where each of the RFIC element and the second inductor elements is mounted. This configuration can also increase strength of the RFID tag.

The first coil-shaped antenna and the second coil-shaped antenna can be configured to conduct wireless communication in a UHF band. This configuration further facilitates generation of stronger magnetic field on each of the mounting surface side and its opposite surface side (i.e., the direction from which the magnetic field flows). Thus, the first coil-shaped antenna and the second coil-shaped antennas can work more effectively. This configuration can further suppress the reduction in communication distance caused by the metal surface.

In another exemplary aspect of the present disclosure, an RFID tagged article includes an article having a metal surface; and an RFID tag attached to the metal surface. In this aspect, the RFID tag includes an RFIC element; a first inductor element that includes a first insulating substrate distanced from and opposite to the metal surface and having a mounting surface on which the RFIC element is mounted, and a first coil-shaped antenna being internally embedded in the first insulating substrate and having a winding axis in a direction perpendicular or substantially perpendicular to the mounting surface; and a second inductor element that includes a second insulating substrate mounted on the mounting surface, and a second coil-shaped antenna being internally embedded in a corresponding one of the second insulating substrates, being electrically connected to the first coil-shaped antenna, and having a winding axis parallel or substantially parallel to the mounting surface. Moreover, the first insulating substrate includes a laminate in which a plurality of dielectric layers or a plurality of magnetic layers are laminated, and the first coil-shaped antenna includes a laminate coil-shaped antenna in which conductor patterns, each being formed on a corresponding one of the layers of the laminate, are connected to each other.

The RFID tag is attached to the metal surface in a way that each of the second inductor elements is disposed closer to the metal surface than the first inductor element is to the metal surface. This configuration further suppresses a reduction in communication distance caused by the metal surface. In other words, the winding axis of each of the second coil-shaped antennas is disposed parallel or substantially parallel to the mounting surface. Thus, a magnetic field flowing in a direction of the winding axis through an opening area of each of the second coil-shaped antennas can be less prone to be influenced by the metal surface. The first inductor element is disposed away from the metal surface so as to suppress the influence of the metal surface. Further, the first insulating substrate includes a laminate, and the first coil-shaped antenna includes a laminate coil-shaped antenna, thereby facilitating generation of stronger magnetic field on each of the mounting surface side and its opposite surface side (i.e., a direction from which the magnetic field flows). Thus, the first coil-shaped antenna and the second coil-shaped antenna can work more effectively. This configuration can further suppress the reduction in communication distance caused by the metal surface. Further, the winding axis of each of the second coil-shaped antennas is disposed parallel or substantially parallel to the mounting surface. Thus, a flow of magnetic flux moving in the direction of the winding axis through the opening area of each of the second coil-shaped antennas can be less prone to be hindered by the metal surface. This configuration also allows the second coil-shaped antennas to receive a magnetic field generated around the metal surface by eddy current. The eddy current is induced on the metal surface by a high frequency signal radiated from an antenna of a reader/writer. This configuration allows the antenna of the reader/writer and the RFID tag to communicate with each other, even when an opening area of the first coil-shaped antenna does not overlap an opening area in the antenna of the reader/writer.

An exemplary embodiment of the present disclosure will be described below with reference to the drawings. It is noted that the present disclosure is not limited to this exemplary embodiment. In addition, in the drawings, substantially the same members are denoted with the same reference signs.

Exemplary Embodiment

Figure 2:
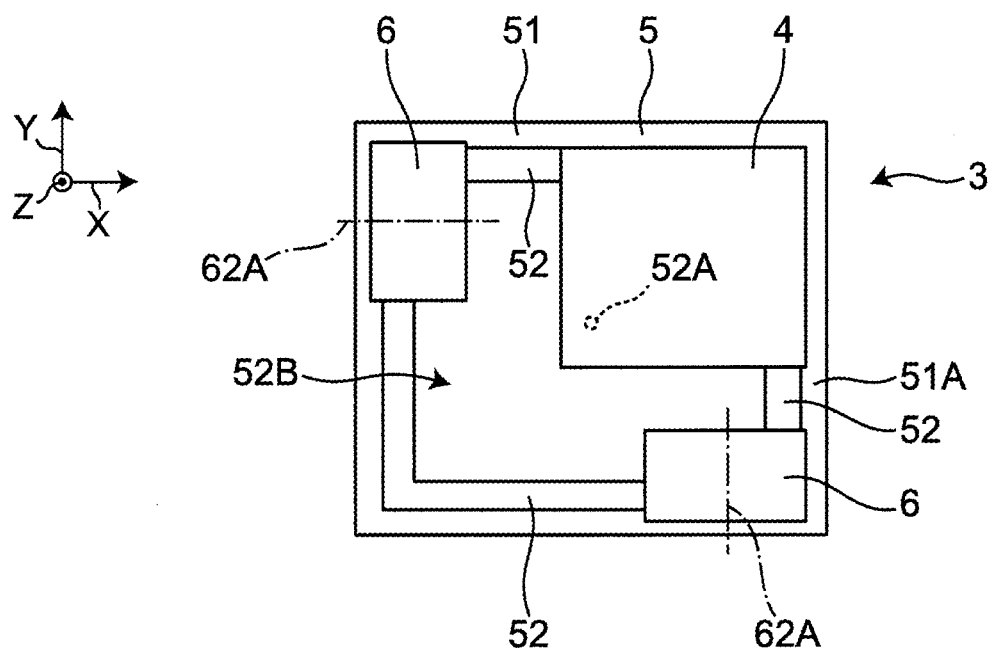
FIG. 2 is a partially transparent bottom view of the RFID tag in FIG. 1.

FIG. 1 is a longitudinal sectional view illustrating a schematic configuration of the RFID tagged article including the RFID tag according to an exemplary embodiment of the present disclosure. FIG. 2 is a partially transparent bottom view of the RFID tag in FIG. 1.

As illustrated in FIG. 1, a radio-frequency identification (RFID) tagged article 1 includes an article 2 and an RFID tag 3. The article 2 has a metal surface 2A to which the RFID tag 3 is attached. The RFID tag 3 is electrically attached to the metal surface 2A via, for example, solder, anisotropic conductive paste (ACP), or capacitive coupling.

The RFID tag 3 includes a radio-frequency integrated circuit (RFIC) element 4, a first inductor element 5, and two second inductor elements 6.

The RFIC element 4 is a chip component that processes a transmitted/received signal of predetermined frequency (for example, in a UHF band or an HF band). In this embodiment, the RFIC element 4 is an RFIC chip corresponding to a communication frequency in the UHF band (860 MHz to 960 MHz). As illustrated in FIG. 2, in plan view (when viewed in a Z direction), the RFIC element 4 is sized to be included in the first inductor element 5, that is, smaller than the first inductor element 5. The RFIC element 4 has, for example, a length of 0.45 mm in an X direction, a length of 0.45 mm in a Y direction, and a length of 0.1 mm in the Z direction. Moreover, the RFIC element 4 is electrically attached to the first inductor element 5 via, for example, solder or anisotropic conductive paste (ACP).

The first inductor element 5 includes a first insulating substrate 51, and a first coil-shaped antenna 52 that is internally embedded in the first insulating substrate 51. In this embodiment, the first inductor element 5 is a chip component (i.e., a chip inductor).

The first insulating substrate 51 is distanced from and opposite to the metal surface 2A and has a mounting surface 51A on which the RFIC element 4 is mounted. In this embodiment, the first insulating substrate 51 includes a laminate in which a plurality of dielectric layers or a plurality of magnetic layers are laminated. The first insulating substrate 51 includes, for example, a ceramic laminate. The first insulating substrate 51 has, for example, a length of 1.2 mm in the X direction, a length of 1.2 mm in the Y direction, and a length of 0.2 mm in the Z direction.

According to the exemplary aspect, the first coil-shaped antenna 52 is a linear antenna conductor that is wound in a coil shape about a winding axis 52A. In this embodiment, the first coil-shaped antenna 52 conducts wireless communication in the UHF band. The first coil-shaped antenna 52 has the winding axis 52A disposed in a direction (Z direction) that is perpendicular or substantially perpendicular to the mounting surface 51A. It is noted that the term "substantially" as used herein is to account for minor variations in the direction that may result from the manufacturing device of the RFID tag, for example. As illustrated in FIG. 2, the first coil-shaped antenna 52 has an opening area 52B in which the RFIC element 4 is partially located. The first coil-shaped antenna 52 has, for example, a length of 0.8 mm in the X direction, a length of 0.8 mm in the Y direction, and a length of 0.164 mm in the Z direction.

Figure 3A:
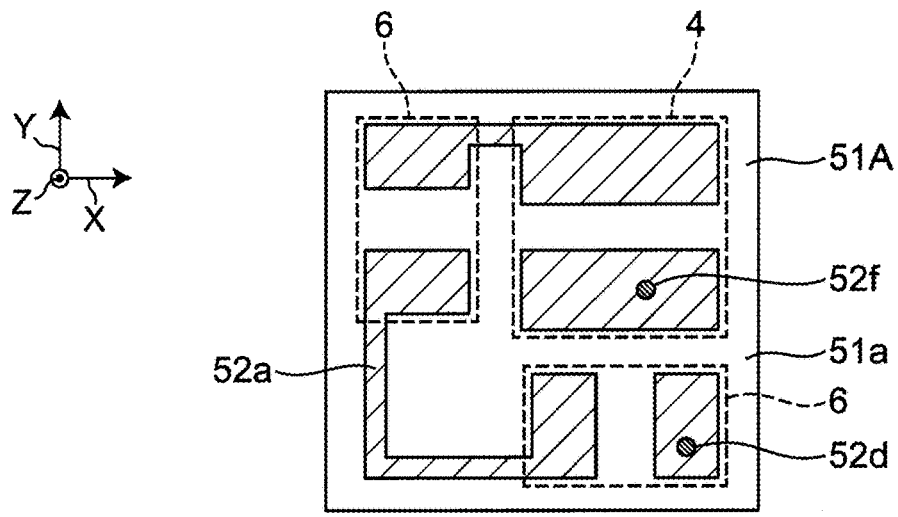
FIG. 3A is a bottom view illustrating a configuration example of a first inductor element included in the RFID tag in FIG. 1.
Figure 3B:
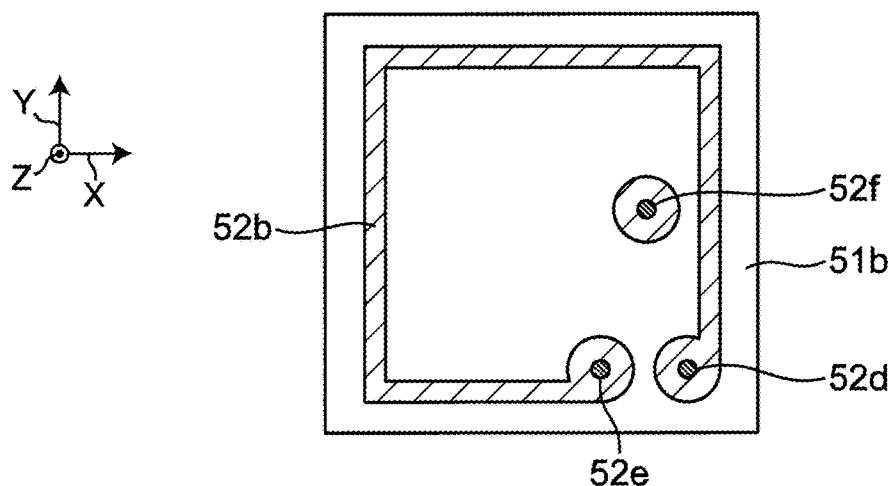
FIG. 3B is a bottom view illustrating the configuration example of the first inductor element included in the RFID tag in FIG. 1.
Figure 3C:
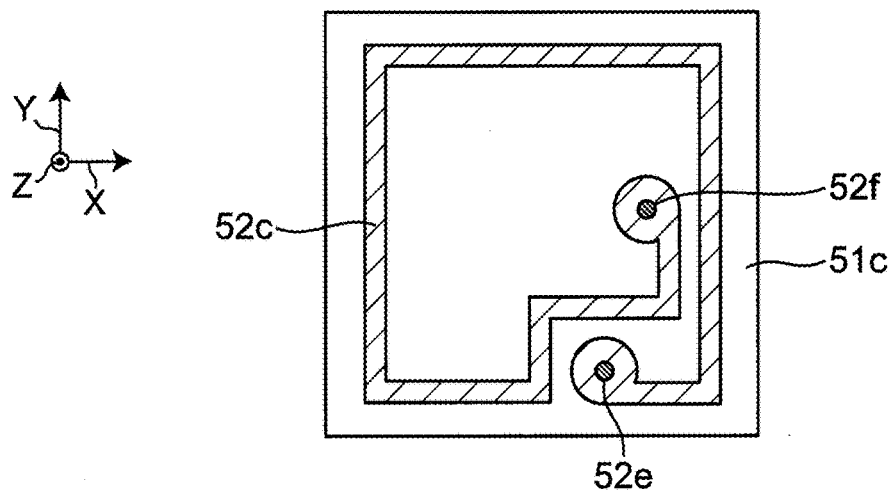
FIG. 3C is a bottom view illustrating the configuration example of the first inductor element included in the RFID tag in FIG. 1.

FIGS. 3A to 3C are bottom views each illustrating a configuration example of the first inductor element 5.

In this embodiment, the first insulating substrate 51 includes a laminate in which three layers 51a, 51b, and 51c, are laminated, as illustrated in FIGS. 3A to 3C. The first coil-shaped antenna 52 includes a laminate coil-shaped antenna in which conductor patterns 52a, 52b, and 52c are connected to each other via interlayer connection conductors 52d, 52e, and 52f. The conductor patterns 52a, 52b, and 52c are formed on the layers 51a, 51b, and 51c, respectively. The first coil-shaped antenna 52 has one end that is electrically connected to one input/output terminal (not shown) of the RFIC element 4. Moreover, the first coil-shaped antenna 52 has the other end that is electrically connected to the other input/output terminal (not shown) of the RFIC element 4.

Further, as illustrated in FIG. 1 and FIG. 2, the two second inductor elements 6 are mounted on the mounting surface 51A of the first insulating substrate 51. In this embodiment, the RFIC element 4 and the two second inductor elements 6 are disposed on the mounting surface 51A while being spaced apart from each other (for example, by 0.125 mm or more). As illustrated in FIG. 2, in plan view (when viewed in the Z direction), the second inductor elements 6 are sized to be included in the first inductor element 5, that is, smaller than the first inductor element 5. The second inductor elements 6 are electrically attached to the first inductor element 5 via, for example, solder or anisotropic conductive paste (ACP). The second inductor elements 6 are designed greater in height from the mounting surface 51A (length in the Z direction) than the RFIC element 4.

Figure 4:
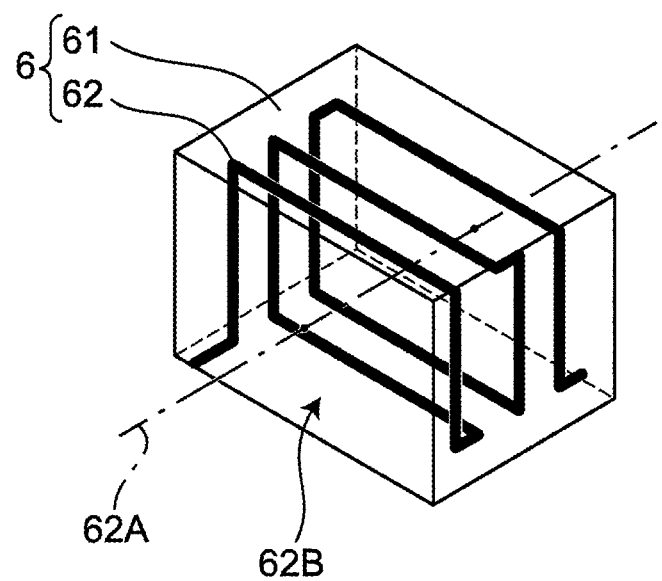
FIG. 4 is a perspective transparent inner view of a second inductor element included in the RFID tag in FIG. 1.

FIG. 4 is a perspective transparent inner view of each of the second inductor elements 6.

As illustrated in FIGS. 1 and 4, each of the second inductor elements 6 includes a second insulating substrate 61, and a second coil-shaped antenna 62 that is internally embedded in the second insulating substrate 61. In this embodiment, the second inductor element 6 is a chip component (chip inductor).

The second insulating substrate 61 is mounted on the mounting surface 51A of the first insulating substrate 51. In this embodiment, the second insulating substrate 61 includes a laminate in which a plurality of dielectric layers or a plurality of magnetic layers are laminated. The second insulating substrate 61 includes, for example, a ceramic laminate. The second insulating substrate 61 has, for example, a length of 0.2 mm in the X direction, a length of 0.4 mm in the Y direction, and a length of 0.3 mm in the Z direction.

The second coil-shaped antenna 62 is a linear antenna conductor that is wound in a coil shape about a winding axis 62A. In this embodiment, the second coil-shaped antenna 62 conducts wireless communication in the UHF band. The second coil-shaped antenna 62 has the winding axis 62A that is disposed parallel or substantially parallel to the mounting surface 51A and also to surface 2A. The two second inductor elements 6 are disposed in a way that the winding axes 62A of the second coil-shaped antennas 62 of the second inductor elements 6 intersect (for example, perpendicularly to) each other. In this embodiment, the second coil-shaped antenna 62 of one of the second inductor elements 6 has the winding axis 62A in the X direction. The second coil-shaped antenna 62 of the other of the second inductor elements 6 has the winding axis 62A in the Y direction. As illustrated in FIG. 2, each of the two second inductor elements 6 is partially located within the opening area 52B of the first coil-shaped antenna 52. The second coil-shaped antenna 62 having the winding axis 62A in the Y direction has, for example, a length of 0.35 mm in the X direction, a length of 0.15 mm in the Y direction, and a length of 0.25 mm in the Z direction.

Each of the second coil-shaped antennas 62 is electrically connected to the first coil-shaped antenna 52. In this embodiment, the two second coil-shaped antennas 62 and the first coil-shaped antenna 52 are configured as a single linear antenna conductor. In other words, the two second coil-shaped antennas 62 are configured to be inserted into a part of the first coil-shaped antenna 52.

Further, in this embodiment, as illustrated in FIG. 1, the first insulating substrate 51 has a resin member 7 formed on the mounting surface 51A in a way that the RFIC element 4 and the second inductor elements 6 are sealed. The resin member 7 suppresses malfunction such as a short circuit caused by water wetting the first insulating substrate 51 in the area where the RFIC element 4 and the second inductor elements 6 are mounted. The resin member 7 also increases strength of the RFID tag 3.

Figure 5:
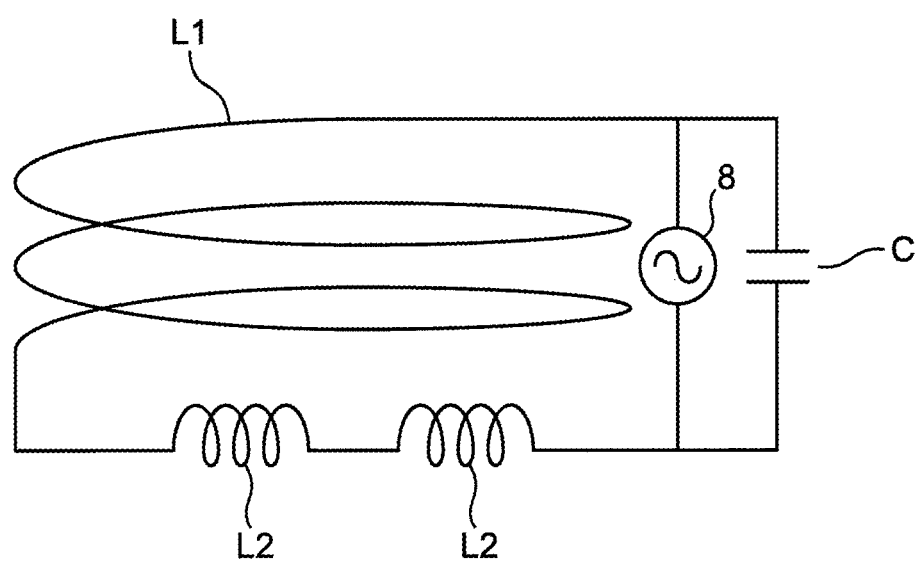
FIG. 5 is an equivalent circuit diagram of the RFID tag in FIG. 1.

FIG. 5 is an equivalent circuit diagram of the RFID tag 3.

In this embodiment, the RFIC element 4 functions as a power supply unit 8 to supply power. The first coil-shaped antenna 52 functions as an inductor L1, and each of the second coil-shaped antennas 62 functions as an inductor L2. In addition, internal capacitance of the RFIC element 4, the first insulating substrate 51, and the second insulating substrates 61 functions as a capacitor C. This arrangement forms an LC parallel resonant circuit.

Figure 6:
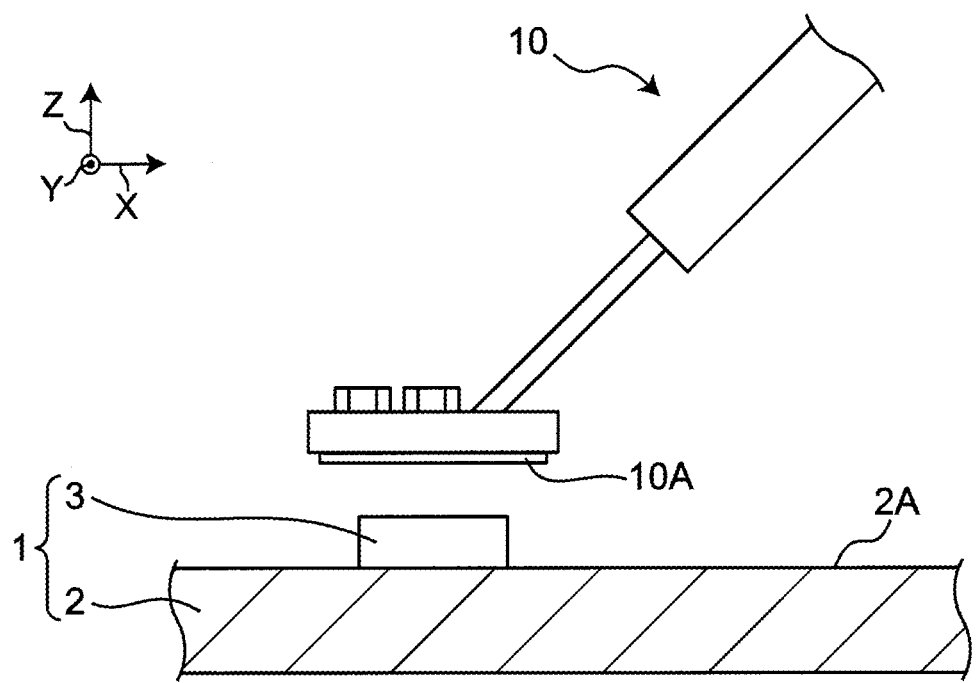
FIG. 6 is a side view of an RFID system, illustrating wireless communication between the RFID tag in FIG. 1 and a reader/writer of the RFID system.

FIG. 6 is a side view of an RFID system, illustrating wireless communication between the RFID tag 3 and a reader/writer 10 of the RFID system.

The RFID system is a non-contact system for transmitting information between the RFID tag 3 and the reader/writer 10. In this embodiment, the RFID tag 3 transmit/receives a high frequency signal in the UHF band to/from the reader/writer 10. In this embodiment, the reader/writer 10 includes an antenna 10A formed of a loop conductor.

As illustrated in FIG. 6, when the antenna 10A of the reader/writer 10 is brought close to the RFID tag 3, the antenna 10A radiates the high frequency signal in the UHF band, and a magnetic field is generated based on the high frequency signal. The magnetic field flows in a direction (Z direction) of the winding axis through the opening area 52B of the first coil-shaped antenna 52. With this configuration, electric current flows in the first coil-shaped antenna 52. In this state, the first inductor element 5 is disposed away from the metal surface 2A, thereby suppressing the influence of the metal surface 2A.

Figure 7:
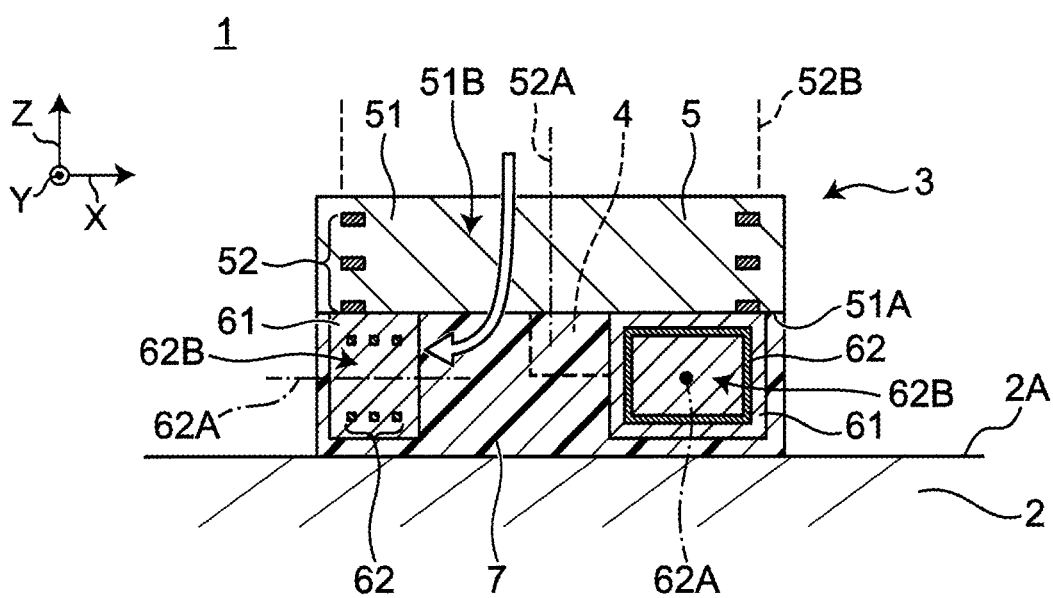
FIG. 7 is a longitudinal sectional view of the RFID tag in FIG. 1, illustrating a state in which a magnetic field flowing in a direction of a winding axis of a first coil-shaped antenna through an opening area of the first coil-shaped antenna is partially reflected off an RFIC element to flow into an opening area of second coil-shaped antennas.

As illustrated in FIG. 7, the magnetic field is partially reflected off the RFIC element 4 to flow into opening area 62B of each of the second coil-shaped antennas 62. With this configuration, electric current flows in each of the second coil-shaped antennas 62. In this state, the winding axis 62A of each of the second coil-shaped antennas 62 is disposed parallel or substantially parallel to the mounting surface 51A. Thus, the magnetic field flowing in a direction of the winding axis through the opening area 62B of each of the second coil-shaped antennas 62 can be less prone to be influenced by the metal surface 2A.

The electric current flowing in each of the first coil-shaped antenna 52 and the second coil-shaped antennas 62 is supplied to the RFIC element 4, and the RFIC element 4 is thereby operated. In return, the RFIC element 4 outputs a response signal. The response signal is radiated from each of the first coil-shaped antenna 52 and the second coil-shaped antennas 62 as a magnetic field to be read by the antenna 10A of the reader/writer 10.

Figure 8:
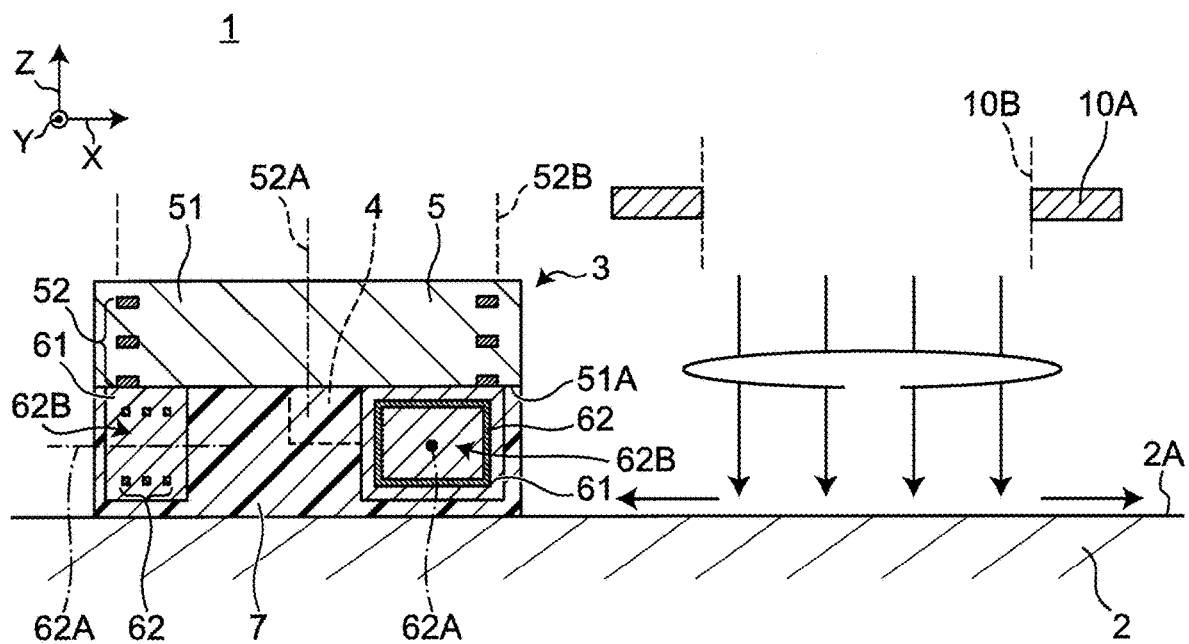
FIG. 8 is a longitudinal sectional view of the RFID system, illustrating the wireless communication between the RFID tag in FIG. 1 and the reader/writer of the RFID system.

The antenna 10A of the reader/writer 10 has an opening area 10B. As illustrated in FIG. 8, when the opening area 10B does not overlap the opening area 52B of the first coil-shaped antenna 52, the high frequency signal in the UHF band radiated from the antenna 10A induces eddy current on the metal surface 2A. The eddy current generates a magnetic field as illustrated by solid arrows in FIG. 8, and the second coil-shaped antenna 62 of at least one of two second inductor elements 6 can receive the magnetic field.

According to this embodiment, the RFID tag 3 is attached to the metal surface 2A in a way that each of the second inductor elements 6 is disposed closer to the metal surface 2A than the first inductor element 5 is to the metal surface 2A. In other words, each of the second inductor elements 6 is between the first inductor element 5 and the metal surface 2A. This configuration is provided to further suppress a reduction in communication distance caused by the metal surface 2A. In other words, the winding axis 62A of each of the second coil-shaped antennas 62 is disposed parallel or substantially parallel to the mounting surface 51A. Thus, the magnetic field flowing in the direction of the winding axis through the opening area 62B of each of the second coil-shaped antennas 62 can be less prone to be influenced by the metal surface 2A. Further, the first inductor element 5 is disposed away from the metal surface 2A so as to suppress the influence of the metal surface 2A.

According to this embodiment, the first insulating substrate 51 includes a laminate, and the first coil-shaped antenna 52 includes a laminate coil-shaped antenna, thereby facilitating generation of stronger magnetic field on each of the mounting surface 51A side and its opposite surface side (i.e., the direction from which the magnetic field flows). Thus, the first coil-shaped antenna 52 and the second coil-shaped antennas 62 can work more effectively. This configuration can further suppress the reduction in communication distance caused by the metal surface 2A.

According to this embodiment, the winding axis 62A of each of the second coil-shaped antennas 62 is disposed parallel or substantially parallel to the mounting surface 51A. Thus, the flow of magnetic flux moving in the direction of the winding axis through the opening area 62B of each of the second coil-shaped antennas 62 can be less prone to be hindered by the metal surface 2A. Further, the high frequency signal radiated from the antenna 10A of the reader/writer 10 induces the eddy current on the metal surface 2A. The second coil-shaped antennas 62 can receive the magnetic field generated by the eddy current. This configuration causes the antenna 10A of the reader/writer 10 and the RFID tag 3 to communicate with each other, even when the opening area 52B of each of the first coil-shaped antennas 52 does not overlap the opening area 10B of the antenna 10A of the reader/writer 10.

According to this embodiment, when viewed in the direction (Z direction) of the winding axis of the first coil-shaped antenna 52, the RFIC element 4 and the second inductor elements 6 are partially located within the opening area 52B of the first coil-shaped antenna 52. This configuration allows a reduction in size of the RFID tag 3.

According to this embodiment, the RFIC element 4 and the second inductor elements 6 are disposed on the mounting surface 51A while being spaced apart from each other. With this configuration, the magnetic field flowing in the direction of the winding axis through the opening area 52B of the first coil-shaped antenna 52 is reflected off the RFIC element 4 to flow into the opening areas 62B of the second coil-shaped antennas 62. Accordingly, the second coil-shaped antennas 62 can work more effectively so as to increase the communication distance of the RFID tag 3.

Further, according to this embodiment, the two second inductor elements 6 are mounted on the mounting surface 51A and have the second coil-shaped antennas 62 disposed in the way that the directions of the winding axes of the second coil-shaped antennas 62 of the second inductor elements 6 intersect each other. This configuration enables the second coil-shaped antenna 62 of the pair of second inductor elements 6 to more reliably receive the magnetic field generated by the eddy current on the metal surface 2A. Accordingly, the second coil-shaped antennas 62 is effectively configured to increase the communication distance of the RFID tag 3.

According to this embodiment, each of the second inductor elements 6 is designed greater in height from the mounting surface 51A than the RFIC element 4. With this configuration, the RFIC element 4 can be less prone to hinder the magnetic field generated by the eddy current on the metal surface 2A from flowing into the opening areas 62B of the second coil-shaped antennas 62.

According to this embodiment, the first insulating substrate 51 has the resin member 7 formed on the mounting surface 51A in the way that the RFIC element 4 and the second inductor elements 6 are sealed. This configuration suppresses malfunction such as the short circuit caused by water wetting the first insulating substrate 51 in the area where the RFIC element 4 and the second inductor elements 6 are mounted. This configuration can also increase the strength of the RFID tag 3.

According to this embodiment, each of the first coil-shaped antenna 52 and the second coil-shaped antennas 62 conducts wireless communication in the UHF band. This configuration further facilitates the generation of stronger magnetic field on each of the mounting surface 51A side and its opposite surface side (i.e., the direction from which the magnetic field flows). Accordingly, the first coil-shaped antenna 52 and the second coil-shaped antennas 62 can work more effectively. This configuration can further suppress the reduction in communication distance caused by the metal surface 2A.

It should be noted that the present disclosure is not limited to the foregoing embodiment, and can be carried out in various modes. For example, in the foregoing embodiment, the two second inductor elements 6 are mounted on the mounting surface 51A, but the present disclosure is not limited thereto. For example, one, or three or more of the second inductor elements 6 may be mounted on the mounting surface 51A. Further, the location where RFIC element 4 and the second inductor elements 6 are mounted is not particularly limited, and may be modified appropriately.

Figure 9:
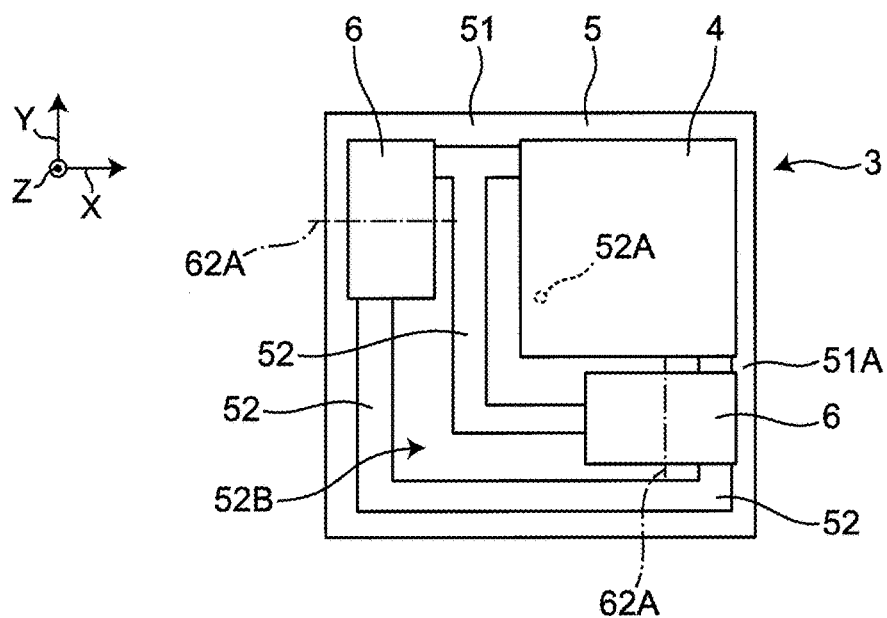
FIG. 9 is a bottom view illustrating a modification of the RFID tag in FIG. 1.

In the foregoing embodiment, each of the two second inductor elements 6 is connected in series with the RFIC element 4, but the present disclosure is not limited thereto. For example, as illustrated in FIG. 9, each of the two second inductor elements 6 may be connected in parallel with the RFIC element 4.

In the foregoing embodiment, when viewed in the Z direction, the RFIC element 4 and the second inductor elements 6 are partially located within the opening area 52B of the first coil-shaped antenna 52, but the present disclosure is not limited thereto. For example, when viewed in the Z direction, the RFIC element 4 and the second inductor elements 6 may be or may not be wholly located within the opening area 52B of the first coil-shaped antenna 52.

Although the present disclosure has been fully described in connection with the preferred embodiment thereof with reference to the accompanying drawings, it is to be noted that various changes and modifications are apparent to those skilled in the art. Such changes and modifications are to be understood as included within the scope of the present disclosure as defined by the appended claims unless they depart therefrom.

The present disclosure provides an RFID tag and an RFID tagged article, each capable suppressing a reduction in communication distance caused by a metal surface when the RFID tag is attached thereto. Accordingly, the RFID tag and the RFID tagged article according to the present disclosure are usable in an RFID system.

EXPLANATIONS OF LETTERS OR NUMERALS

1 RFID TAGGED ARTICLE
2 ARTICLE
2A METAL SURFACE
3 RFID TAG
4 RFIC ELEMENT
5 FIRST INDUCTOR ELEMENT
6 SECOND INDUCTOR ELEMENT
7 RESIN MEMBER
8 POWER SUPPLY UNIT

10 READER/WRITER
10A ANTENNA
10B OPENING AREA
51 FIRST INSULATING SUBSTRATE
51A MOUNTING SURFACE
51a, 51b, 51c LAYER
52 FIRST COIL-SHAPE ANTENNA
52A WINDING AXIS
52B OPENING AREA
52a, 52b, 52c CONDUCTOR PATTERN
52d, 52e, 52f INTERLAYER CONNECTION CONDUCTOR
61 SECOND INSULATING SUBSTRATE
62 SECOND COIL-SHAPED ANTENNA
62A WINDING AXIS
62B OPENING AREA
L1, L2 INDUCTOR
C CAPACITOR

The invention claimed is:

1. An RFID tag comprising:
an RFIC element;
a first inductor element that includes a first insulating substrate having a mounting surface coupled to the RFIC element, and a first coil-shaped antenna internally embedded in the first insulating substrate and having a winding axis extending in a direction perpendicular or substantially perpendicular to the mounting surface; and
a second inductor element that includes a second insulating substrate coupled to the mounting surface, and a second coil-shaped antenna internally embedded in the second insulating substrate, electrically connected to the first coil-shaped antenna, and having a winding axis extending in a direction parallel or substantially parallel to the mounting surface,
wherein the first insulating substrate includes a laminate having a plurality of dielectric layers or a plurality of magnetic layers, and the first coil-shaped antenna includes a laminate coil-shaped antenna with a plurality of conductor patterns disposed on a corresponding one of the plurality of dialectic or magnetic layers of the laminate, respectively, with the plurality of conductor patterns connected to each other through respective interlayer connection conductors, and
wherein the RFIC element and the second inductor element are at least partially disposed within an opening area of the first coil-shaped antenna when viewed in a direction of the winding axis of the first coil-shaped antenna.

2. The RFID tag according to claim 1, wherein the RFIC element and the second inductor element are each disposed on the mounting surface and spaced apart from each other.

3. The RFID tag according to claim 1, wherein the second inductor element comprises a plurality of second inductor elements disposed on the mounting surface, with each of the plurality of second inductor elements including a respective second coil-shaped antenna with a respective winding axis that extends in the direction parallel or substantially parallel to the mounting surface.

4. The RFID tag according to claim 3, wherein respective winding axes of the plurality of second inductor elements intersect each other.

5. The RFID tag according to claim 4, wherein each of the plurality of second inductor elements are connected in series with the RFIC element.

6. The RFID tag according to claim 4, wherein each of the plurality of second inductor elements are connected in parallel with the RFIC element.

7. The RFID tag according to claim 1, wherein the second inductor element is disposed farther away from the mounting surface than the RFIC element.

8. The RFID tag according to claim 1, wherein the first insulating substrate has a resin member disposed on the mounting surface to seal the RFIC element and the second inductor element.

9. The RFID tag according to claim 1, wherein each of the first coil-shaped antenna and the second coil-shaped antenna is configured to wirelessly communicate data in a UHF band.

10. An RFID tag comprising:
an RFIC element;
a first inductor element that includes a first insulating substrate having a surface coupled to the RFIC element, and a first coil-shaped antenna embedded in the first insulating substrate and having a winding axis extending perpendicularly to the mounting surface; and
at least one second inductor element that includes a second insulating substrate coupled to the mounting surface, and a second coil-shaped antenna embedded in the second insulating substrate and having a winding axis extending in parallel to the mounting surface,
wherein the first coil-shaped antenna is electrically connected to the second coil-shaped antenna,
wherein the first insulating substrate includes a laminate having a plurality of dielectric layers or a plurality of magnetic layers, and the first coil-shaped antenna includes a laminate coil-shaped antenna with a plurality of conductor patterns disposed on a corresponding one of the plurality of dialectic or magnetic layers of the laminate, respectively, with the plurality of conductor patterns connected to each other through respective interlayer connection conductors, and
wherein the RFIC element and the second inductor element are at least partially disposed within an opening area of the first coil-shaped antenna when viewed in a direction of the winding axis of the first coil-shaped antenna.

11. The RFID tag according to claim 10, wherein the RFIC element and the second inductor element are each disposed on the mounting surface and spaced apart from each other.

12. The RFID tag according to claim 10, wherein the second inductor element comprises a plurality of second inductor elements disposed on the mounting surface, with each of the plurality of second inductor elements including a respective second coil-shaped antenna with a respective winding axis that extends in the direction parallel or substantially parallel to the mounting surface.

13. The RFID tag according to claim 12, wherein respective winding axes of the plurality of second inductor elements intersect each other.

14. An RFID tagged article comprising:
a metal surface; and
an RFID tag attached to the metal surface and:
an RFIC element;
a first inductor element that includes a first insulating substrate having a mounting surface coupled to the RFIC element, and a first coil-shaped antenna internally embedded in the first insulating substrate and having a winding axis extending in a direction perpendicular or substantially perpendicular to the mounting surface; and a second inductor element that includes a second insulating substrate disposed on the mounting surface, and a second coil-shaped antenna internally embedded in the second insulating substrate, electrically connected to the first coil-shaped antenna, and having a winding axis parallel or substantially parallel to the mounting surface, wherein the second inductor element is coupled between first inductor element and the metal surface, wherein the first insulating substrate includes a laminate having a plurality of dielectric layers or a plurality of magnetic layers, and the first coil-shaped antenna includes a laminate coil-shaped antenna with a plurality of conductor patterns disposed on a corresponding one of the plurality of dialectic or magnetic layers of the laminate, respectively, with the plurality of conductor patterns connected to each other through respective interlayer connection conductors, and wherein the RFIC element and the second inductor element are at least partially disposed within an opening area of the first coil-shaped antenna when viewed in a direction of the winding axis of the first coil-shaped antenna.

15. The RFID tagged article according to claim 14, wherein the second inductor element comprises a plurality of second inductor elements disposed on the mounting surface, with each of the plurality of second inductor elements including a respective second coil-shaped antenna with a respective winding axis that extends in the direction parallel or substantially parallel to the mounting surface.

16. The RFID tagged article according to claim 15, wherein respective winding axes of the plurality of second inductor elements intersect each other.

* * * * *